United States Patent [19]
Ellis, III

[11] Patent Number: 5,102,057
[45] Date of Patent: Apr. 7, 1992

[54] AUTOMATIC PLASTIC CRUSHER APPARATUS

[76] Inventor: William H. Ellis, III, Box 43, RD 2, Frenchtown, N.J. 08825

[21] Appl. No.: 702,382

[22] Filed: May 20, 1991

[51] Int. Cl.$^5$ ............................................. B02C 19/14
[52] U.S. Cl. ................................. 241/99; 100/158 R; 241/36; 241/260.1
[58] Field of Search .................... 241/36, 99, 251-253, 241/260.1, 261.1, 257 R; 100/158 R, 158 C

[56] References Cited

U.S. PATENT DOCUMENTS

| | | | |
|---|---|---|---|
| 1,324,389 | 12/1919 | Euola | 241/233 X |
| 3,504,621 | 4/1970 | Qualheim | 241/99 |
| 3,713,596 | 1/1973 | Hoffmann | 241/99 |
| 3,951,059 | 4/1976 | Morris | 241/99 |
| 4,703,899 | 11/1987 | Lodovico | 241/99 |
| 4,923,126 | 5/1990 | Lodovico et al. | 241/99 |
| 4,949,916 | 8/1990 | Wroblewski | 241/260.1 X |
| 4,993,649 | 2/1991 | Uoenig | 241/260.1 X |

*Primary Examiner*—Douglas D. Watts
*Attorney, Agent, or Firm*—Kenneth P. Glynn

[57] ABSTRACT

The present invention is directed toward an apparatus for compressing plastic waste for the purposes of minimizing space, maximizing manageability and otherise improving the logistics of household recycling. The claimed invention is an electrically powered machine that rotates a plurality of converging, tapered cylinders. Each cylinder has chisel pointed teeth arranged in a helical pattern along the surface of each cylinder. Once a piece of plastic material is placed between the cylinders, the motor is turned on. The cylinders all rotate in the same direction. The pointed teeth on the cylinders grab the plastic material, forcing it deeper between the converging cylinders. The rotation of the cylinder, with the protruding teeth, cause the plastic material to twist as it is pulled downward. Eventually, the plastic material is passed through the bottom of the converging cylinders, wherein the plastic material is oriented in a tightly compressed and twisted cylindrical form. The plastic material now takes up a minimum of space and is easily handled for recycling purposes, both in the home and at the recycling center.

16 Claims, 2 Drawing Sheets

AUTOMATIC PLASTIC CRUSHER APPARATUS

BACKGROUND OF THE INVENTION

1. Field of the Invention

The present invention is directed toward an apparatus for crushing and otherwise pulverizing plastic manufactured articles, and more particularly to such apparatuses that use rotating cylinders, with helically positioned chisel pointed teeth, to grab, twist and push plastic articles through a narrow exit orifice and into a holding bin.

2. Prior Art Statement

Plastic is material of choice for a majority of today's manufactured goods. As a result, plastic makes up the largest percentage of solid waste present in landfills. As many solid waste dumps across the country are approaching their maximum capacity, many municipalities have established recycling programs that include the recycling of plastics. Unlike paper and aluminum cans, plastic is used in a home in an infinite variety of sizes and shapes. Most plastic utilized by consumers are used as containers and packaging. Consequently, when the plastic is discarded it retains most, if not all, of its original shape. The bulk of the material makes plastic hard to store and handle and does not lend itself readily to the logistics of recycling.

The present invention provides an automated machine that reduces the size and shape of plastic manufactured articles. The present invention so orients the plastic that it is compressed into its most dense form. The compacted plastic is now readily stored and easily recycled.

The problem of handling the bulk of used plastic materials has been in existence for many years. Consequently, numerous devices have been invented and patented that crush, squeeze and shred plastic into more manageable forms. Prior art that is addressed directly to the comminution of plastic for the purposes of recycling are exemplified by the following:

U.S. Pat. Nos. 4,703,899 to Lodovico, 3,951,059 to Morris, 3,504,621 to Qualheim and 4,923,126 to Lodovico et al, all show machines that use a series of shaping or cutting wheels to either flatten or pulverize plastic material. The end result of these prior art machines is either a flattened plastic product or plastic confetti. The flattened plastic products are only compressed in one plane and still demand a substantial space to be stored. The plastic shreddings are hard to handle and are difficult to recollect if accidentally spilled. As a result, neither the flattened or shredded plastic products are ideal for home recycling use.

U.S. Pat. No. 3,713,596 to Hoffman shows a device for crushing glass bottles. This prior art is the only invention found that uses a plurality of augers, arranged in a converging orientation, to compress materials. This invention differs from the present claimed invention in that the present invention offers a plurality of chisel pointed teeth helically arranged on a tapered cylinder. The converging orientation offers the same physics of compression as does Hoffman but the pointed teeth grab the plastic, twisting the material as it is compressed. The end result of the present claimed invention would be a tightly compressed cylinder of material that is easily handled and has a small volume.

Thus, although prior art does show devices that have cutting blades and screw augers that engage and drive recyclable materials, prior art does not teach or suggest an apparatus that positions pointed teeth on tapered cylinders, the combination of teeth from a plurality of cylinders acting to simultaneously twist and compress a plastic product into a form more easily handled.

SUMMARY OF THE INVENTION

The present invention is directed toward an apparatus for compressing plastic waste for the purposes of minimizing space, maximizing manageability and otherwise improving the logistics of household recycling. The claimed invention is an electrically powered machine that rotates a plurality of converging, tapered cylinders. Each cylinder has chisel pointed teeth arranged in a helical pattern along the surface of each cylinder. Once a piece of plastic material is placed between the cylinders, the motor is turned on. The cylinders all rotate in the same direction. The pointed teeth on the cylinders grab the plastic material, forcing it deeper between the converging cylinders. The rotation of the cylinder, with the protruding teeth, cause the plastic material to twist as it is pulled downward. Eventually, the plastic material is passed through the bottom of the converging cylinders, wherein the plastic material is oriented in a tightly compressed and twisted cylindrical form. The plastic material now takes up a minimum of space and is easily handled for recycling purposes, both in the home and at the recycling center.

BRIEF DESCRIPTION OF THE DRAWINGS

The invention will be more fully understood by referring to the following detailed specifications, the above specification and the claims set forth herein, when taken in connection with the drawings appended hereto, wherein:

DETAILED DESCRIPTION OF THE PRESENT INVENTION

The present invention is, as mentioned, directed toward an apparatus that compacts plastic articles into a form, shape and density that allows the material to be easily stored and recycled. In today's society more and more households are being required to recycle their plastic wastes. Since plastic is usually used as a container, i.e. soda bottles, cups, etc., plastic waste is highly bulky and has an extremely large size-to-weight ratio. When a household is required to recycle plastic, the recycle bin can quickly become filled with plastic. Since the collection of recyclable waste by local municipalities is not a daily event, many households must store the overflow of plastic waste in or around their homes. An obvious solution to the recycling of plastic waste is to compact the plastic before it is stored in a recycling bin. In the absence of some mechanical advantage, most people can only reduce the size of plastic products by one-third. With machines, plastic products can be reduced to under one-tenth of their original size. The invention described below shows the best mode for a novel device that compacts plastic products into a form that is both easily stored and handled in a household.

Figure 1:
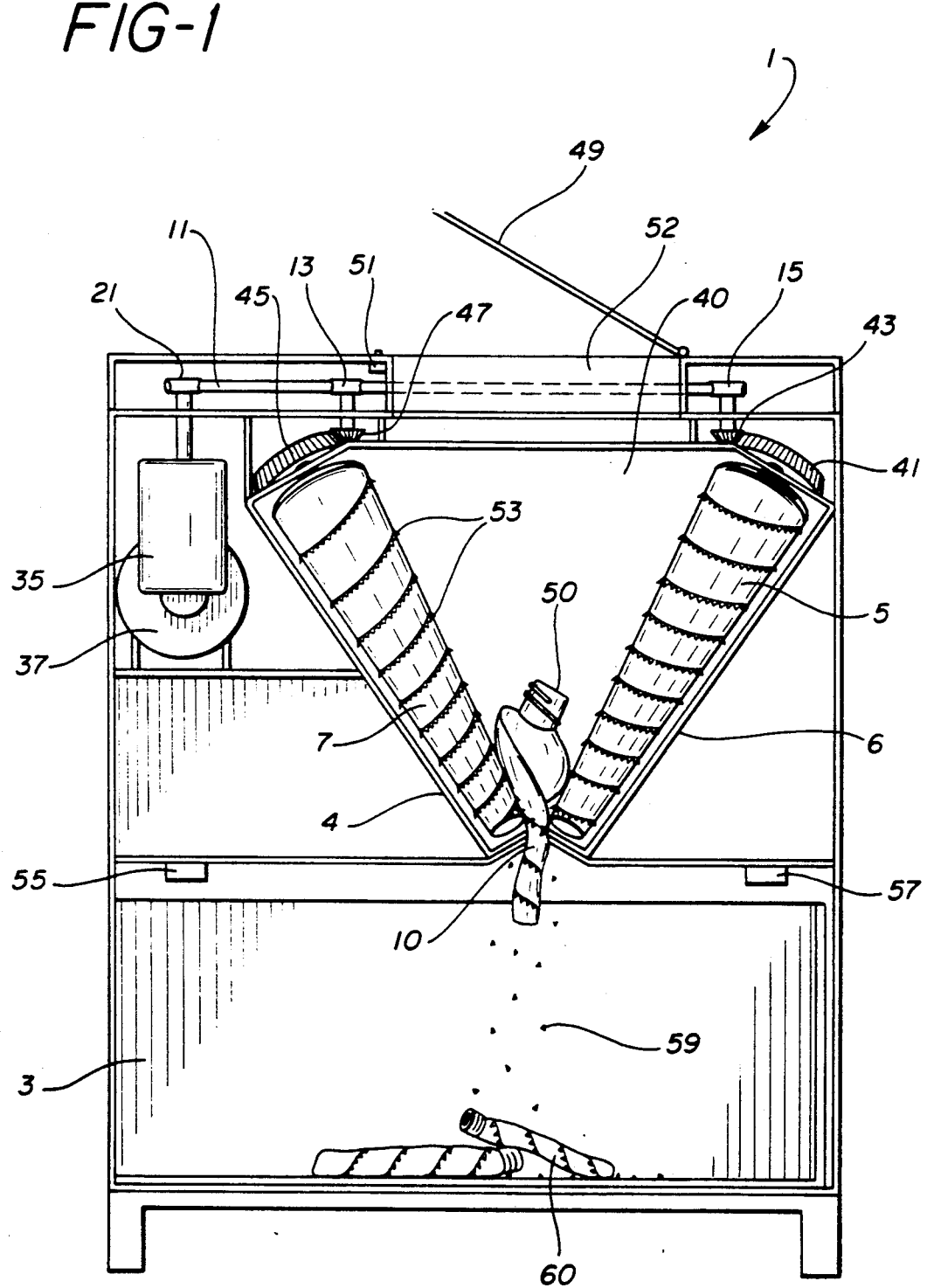
FIG. 1 shows a side, partially cross-sectioned view of one preferred embodiment of the present invention.

Referring now to FIG. 1, there is shown a side partially cross-sectioned view of one preferred embodiment of the present invention. As is shown by FIG. 1, there is a chamber 40 that has converging walls 4,6. The chamber 40 has a top inlet 52, covered by a hinged door 49. Within the chamber 40 are a plurality of tapered cylinders 5, 7. The cylinders 5, 7 follow the slope of the chamber walls 4,6 and converge toward the bottom. A small outlet opening 10 exists at the bottom of the chamber between the lower ends of the tapered cylinder 5, 7. Each cylinder 5, 7 is tapered, having a large diametered upper end and a small diametered lower end. Additionally, each tapered cylinder 5,7 has a multitude of chisel pointed teeth 53 arranged on its circumferential surface in a continuous helical pattern.

Each tapered cylinder 5, 7 is free to rotate about its longitudinal axis. Each tapered cylinder 5, 7 has a large diameter upper end and a small diameter lower end. The upper ends of each tapered cylinder 5,7 terminate in a beveled drive gear 41, 45 that engages a beveled pinion gear 43, 47. The beveled pinion gear 43, 47 is driven by a drive means which is shown by electric motor 37. Although the drive means shown is an electric motor 37 and a gear box 35 that drive a belt 11 and turns the pinion gears 47, 43, it should be understood that any known drive transference means can be employed. The drive belt 11 can be replaced by a chain or a series of interconnecting gears. The beveled pinion gears 47, 43 and drive gears 41, 45 can be replaced by spur gears or the use of any axle universal design. Thus, any of the known means of changing the axis of rotation in a mechanical means can be adapted to drive the tapered cylinders 7, 5 of the claimed invention.

The engagement of the drive means with the tapered cylinders 7, 5 cause all the tapered cylinders 7, 5 to rotate in the same direction. The orientation of the helically positioned pointed teeth 53 on the tapered cylinders 7, 5 drive downward as the tapered cylinders 7, 5 are rotated.

Figure 2:
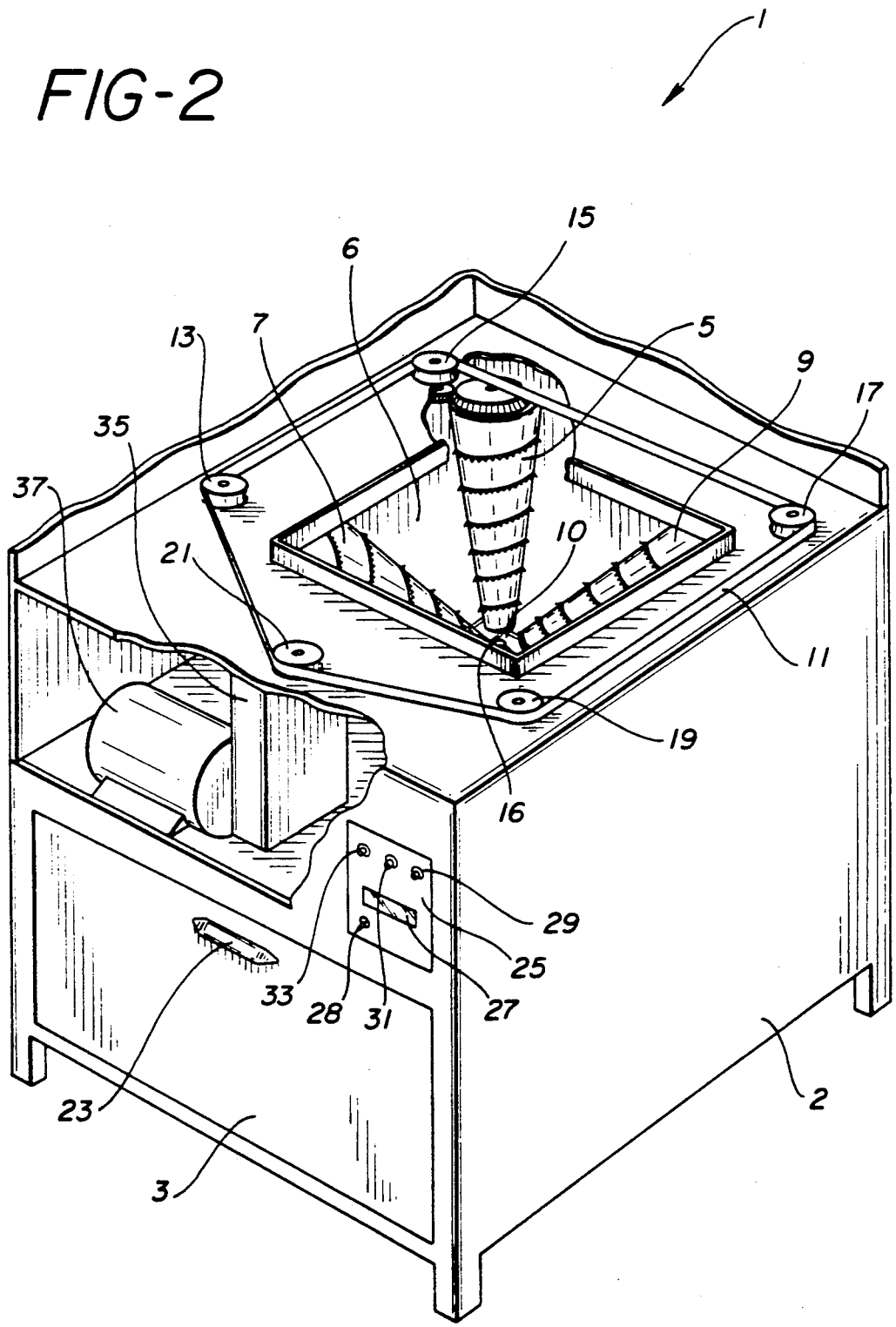
FIG. 2 shows a fragmented prospective view of the embodiment shown in FIG. 1, having its top cover and safety guides removed to best illustrate the inner workings.

FIG. 2 shows a prospective, fragmented view of the preferred embodiment previously illustrated in FIG. 1. FIGS. 1 and 2 have like parts being like numbered, and although neither figure can show all the elements of the claimed invention, when combined the full nature of the invention is shown. Thus, referring now to FIG. 1 and FIG. 2 in combination, the workings of the claimed invention will be best described.

The purpose of the claimed invention is to crush and compress plastic, so when a piece of plastic material (i.e. a plastic soda bottle 50) is to be discarded, it is done so by the following process. The lid 49 covering the inlet 52 on the top of the present invention is opened. The opening of the lid 49 disengages a safety switch 51 that ensures that invention 1 cannot be operated while the lid 49 remains open. A piece of plastic material 50 is then inserted into the chamber 40 and the lid 49 is closed. With the plastic 50 in position, the motor 37 is activated by the user. Typically, activation would be via an on/off switch 33 on the control panel 25 of the machine 2. A light 31 will inform a user as to whether the machine 2 is on or off. The switch 33 may also be a three-way switch, acting as an on/off as well as a reverse switch to dislodge any materials caught between the tapered cylinders 5, 7, 9, 16.

With the plastic 50 in the chamber 40 and the drive means activated, the chisel pointed teeth 53 on the tapered cylinders 5, 7, 9, 16 grab into the plastic 50. The synchronous rotational movement of the tapered cylinders 5, 7, 9, 16 cause the plastic 50 to rotate in the opposite direction as the tapered cylinders 5, 7, 9, 16, the rotational motion causing the plastic 50 to twist. Additionally, the position of the chisel pointed teeth 53 on the tapered cylinders 5, 7, 9, 16, as they rotate, pull the plastic 50 down deeper between the converging tapered cylinders 5, 7, 9, 16. As the plastic 50 is pulled further and further downward, the area between the tapered cylinders 5, 7, 9, 16 become smaller and consequently the plastic 50 is twisted more tightly. Eventually, the plastic 50 will be twisted and squeezed into a thin cylindrical shape that allows it to pass through the outlet 10 at the base of the chamber 40. If, by chance, the plastic 50 binds between the tapered cylinders 5, 7, 9, 16, the chisel pointed teeth 53 quickly wear down the edges of the plastic 50, pulverizing the obstruction and letting the remainder of the plastic 50 be properly compacted. Additionally, the tapered configurations of the elongated cylinders 5, 7, 9, 16 allow the pointed teeth 53 to rotate at different velocities, the disparity in rotational velocities helping in the twisting of the plastic object 50.

Once the plastic material has passed through the bottom outlet 10 of the crushing chamber 40, it passes into a removable storage bin 3. The storage bin 3 holds all the compacted plastic 60 along with any smaller pieces 59 caused by the comminution effect of the chisel pointed teeth 53. Once the storage bin 3 is filled it is removed, emptied and replaced.

The shown embodiment of the present invention 1 also has a number of built-in safety features. As was previously mentioned, the lid 49 engages a safety switch 51 that disables the machine 2 if the lid 49 is not properly closed. Another feature is the presence of an overfill switch above the storage bin. This switch is shown as an electric eye with parts 55 and 57 in FIG. 1. This electric eye would prevent the machine 2 from running if the compacted plastic 60 was stored to high in the bin when the machine was started. The same electric eye 55, 57 could also act as a time control device. The electric eye 55, 57 can keep the machine running until the outlet orifice 10 in the bottom of the chamber is clear. In this manner, the machine 2 will only run as long as plastic 50 is present within the chamber 40. As a backup to the electric eye, the present invention 1 may come equipped with a timer 27. The machine may only run for a predetermined time to prevent excessive engine wear and heat. Thus, if the electric eye 55, 57 does not indicate that the outlet orifice 10 is clear, the drive means will stop after a predetermined time.

Lastly, like most electrically driven appliances, the present invention 1 may come with a built-in circuit breaker 28, the circuit breaker 28 stopping the flow of power to the drive means if any material jams in the chamber 40 and overwhelms the available power of the invention 1.

Although the illustration of FIG. 1 shows a plastic bottle 50 be processed, it should be understood that any recyclable plastic may be used with this invention. Ductile plastics will be twisted and compressed, while brittle plastics will be pulverized into small pieces. With any recyclable plastic, the present invention will reduce its size- to-weight ratio by up to 95%, leaving all plastic materials to be easily stored, handled and recycled.

The embodiment of the present invention represented in FIGS. 1 and 2 only represent one form of the present invention. It is therefore understood that although the invention described within the above specification shows the best mode of the present invention, numerous mechanically equivalent parts, configurations and materials may be used, thus allowing the invention to be practiced other than as specifically described within.

What is claimed is:

1. A plastic crushing apparatus comprising:
   (a) a downwardly tapered chamber;
   (b) an inlet at the top of said chamber for the receiving of plastic objects;
   (c) an outlet at the bottom of said chamber for the exiting of compacted plastic objects;
   (d) a plurality of substantially upright elongated cylinders mounted within said tapered chamber, converging downwardly toward one another, each said elongated cylinder having a multitude of pointed teeth protruding therefrom arranged in a helical pattern for the gripping and comminuting of plastic objects therebetween; and
   (e) a means for rotatably driving said elongated cylinders, causing all said elongated cylinders to rotate simultaneously in the same direction so that said pointed teeth positioned thereupon pull and twist plastic objects downwardly into said tapered chamber.

2. The apparatus of claim 1 wherein said elongated cylinders are tapered, having a large diameter top end and a small diameter bottom end.

3. The apparatus of claim 1 wherein said tapered chamber has an inverted multi-sided pyramidal configuration and one said elongated cylinder is mounted in substantial alignment with each edge of said chamber.

4. The apparatus of claim 1 wherein the rotation of said elongated cylinders and said pointed teeth positioned thereon cause all plastic objects in contact with a plurality of said elongated cylinders to twist and elongate until the diameter of said plastic objects is equivalent to the distance between said contacted elongated cylinders.

5. The apparatus of claim 1 wherein a removable storage bin is positioned below said outlet at the bottom of said chamber to collect compacted plastic objects.

6. The apparatus of claim 1 wherein each said pointed tooth is sharpened, allowing same to cut through and otherwise comminute any recyclable plastic material.

7. The apparatus of claim 1 wherein a closeable lid covers said inlet atop said chamber, said lid being connected to a safety switch, preventing said drive means from running while said lid is open.

8. The apparatus of claim 1 wherein a sensor device determines if plastic material is present within said chamber, said sensing device controlling how long said drive means will run.

9. The apparatus of claim 8 wherein a timing device is connected to said drive means, said timing device stopping said drive means if said drive means remains running for longer than a predetermined time.

10. The apparatus of claim 1 wherein said drive means is attached to a circuit breaker, preventing said drive means from working beyond its designed capacity.

11. The apparatus of claim 1 wherein each said elongated cylinder terminates at its top end with a beveled drive gear, each said drive gear engaging a smaller beveled pinion gear, which in turn, is driven by said drive means.

12. The apparatus of claim 1 wherein said outlet at the bottom of said chamber is between one square inch and 5 square inches in size.

13. The apparatus of claim 2 wherein the taper of said elongated cylinders cause said pointed teeth positioned toward said large diameter top end of said elongated cylinder to rotate at a greater velocity than said pointed teeth positioned toward said small diameter bottom end of said elongated cylinder, the disparity of velocities between said pointed teeth causing differing portions of a plastic object positioned between said plurality of elongated cylinders to rotate at different speeds, causing said plastic object to twist until the diameter of said plastic object is equivalent to the distance between said plurality of elongated cylinders.

14. The apparatus of claim 2 wherein each of said pointed teeth positioned on said elongated cylinders has a sharpened edge, allowing same to cut through and otherwise comminute any plastic object so oriented or manufactured so as to resist twisting.

15. The apparatus of claim 2 wherein each of said pointed teeth positioned on said elongated cylinders is dulled, allowing said pointed teeth to grip and twist said plastic object, but not to cut or otherwise comminute said plastic object.

16. The apparatus of claim 1 wherein said means for rotatably driving said elongated cylinders can be reversed to dislodge any plastic object caught between said elongated cylinders.

* * * * *